United States Patent [19]

Ouellette

[11] Patent Number: 4,669,602

[45] Date of Patent: Jun. 2, 1987

[54] PRODUCT TURNING DEVICE FOR CONVEYOR

[75] Inventor: Joseph F. Ouellette, Glendale, Mo.

[73] Assignee: Ouellette Machinery Systems, Inc., Fenton, Mo.

[21] Appl. No.: 288,520

[22] Filed: Jul. 30, 1981

[51] Int. Cl.⁴ ............................................ B65G 47/24
[52] U.S. Cl. ................................ 198/413; 198/415; 198/782
[58] Field of Search ............... 198/411, 412, 413, 394, 198/395, 400, 782, 787, 415, 456

[56] References Cited

U.S. PATENT DOCUMENTS

| | | |
|---|---|---|
| 1,791,962 | 2/1931 | Holtus ............................... 198/782 X |
| 1,860,718 | 5/1932 | Mott ...................................... 198/787 |
| 2,007,334 | 7/1935 | Lamberton ............................ 198/413 |
| 2,023,880 | 12/1935 | Cassen ................................. 198/413 |
| 2,222,503 | 11/1940 | Essen .................................... 198/394 |
| 2,734,618 | 2/1956 | Palmer ................................. 198/413 |
| 2,767,666 | 10/1956 | Rhodes ................................. 198/415 |
| 2,805,753 | 9/1957 | Palmer ................................. 198/633 |
| 3,086,640 | 4/1963 | Verrinder ............................ 198/413 |
| 3,308,923 | 3/1967 | Crawford ............................ 198/395 |
| 3,687,263 | 8/1972 | Randrup ............................. 198/400 |
| 4,257,320 | 3/1981 | Holbrook et al. .................. 198/782 |
| 4,422,543 | 12/1983 | Stubbings ........................... 198/782 |
| 4,463,846 | 8/1984 | Ionescu ............................... 198/400 |
| 4,465,176 | 8/1984 | Long, Jr. ............................. 198/400 |
| 4,561,534 | 12/1985 | Nalbach .............................. 198/400 |

FOREIGN PATENT DOCUMENTS

| | | | |
|---|---|---|---|
| 1247951 | 8/1967 | Fed. Rep. of Germany ...... 198/782 |
| 57-145707 | 9/1982 | Japan ................................... 198/787 |
| 591373 | 2/1978 | U.S.S.R. ............................. 198/787 |

Primary Examiner—Joseph E. Valenza
Attorney, Agent, or Firm—Rogers, Howell, Moore & Haferkamp

[57] ABSTRACT

A product turning device suitable for direct mounting in a conveyor stream includes a first driven input roller which applies an accelerating force to the product as it enters the turner and which has a knurl at one end to slightly skew the product into the turning motion, and a transfer roller with a multi-beveled knurl which moves transversely against the side of the product and contacts its bottom surface to accomplish the turn. A series of guide bumpers and a guide bracket maintain alignment of the product as the input roller skews the product, and the transfer roller turns it. The knurl operates on the product with a first vertical bevel which pushes the front of the product to further skew it, a second and third bevel which ride under the product and smoothly accelerate it, and a fourth flattened bevel which supports the rear corner of the product and conveys it at a speed somewhat faster than the conveyor surface speed as the transfer roller returns to its home position, thereby whipping the rear of the product around and through the turn.

22 Claims, 11 Drawing Figures

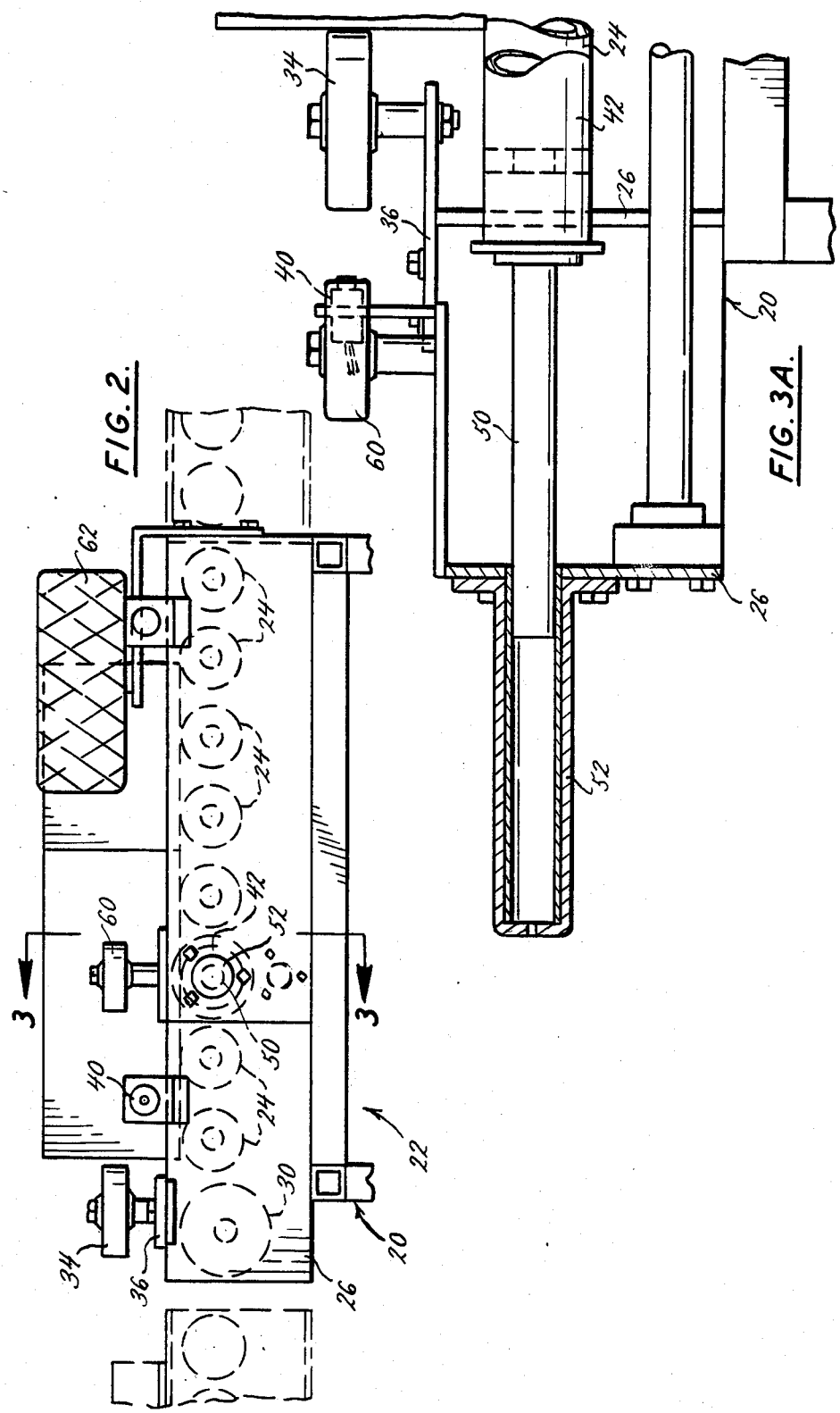

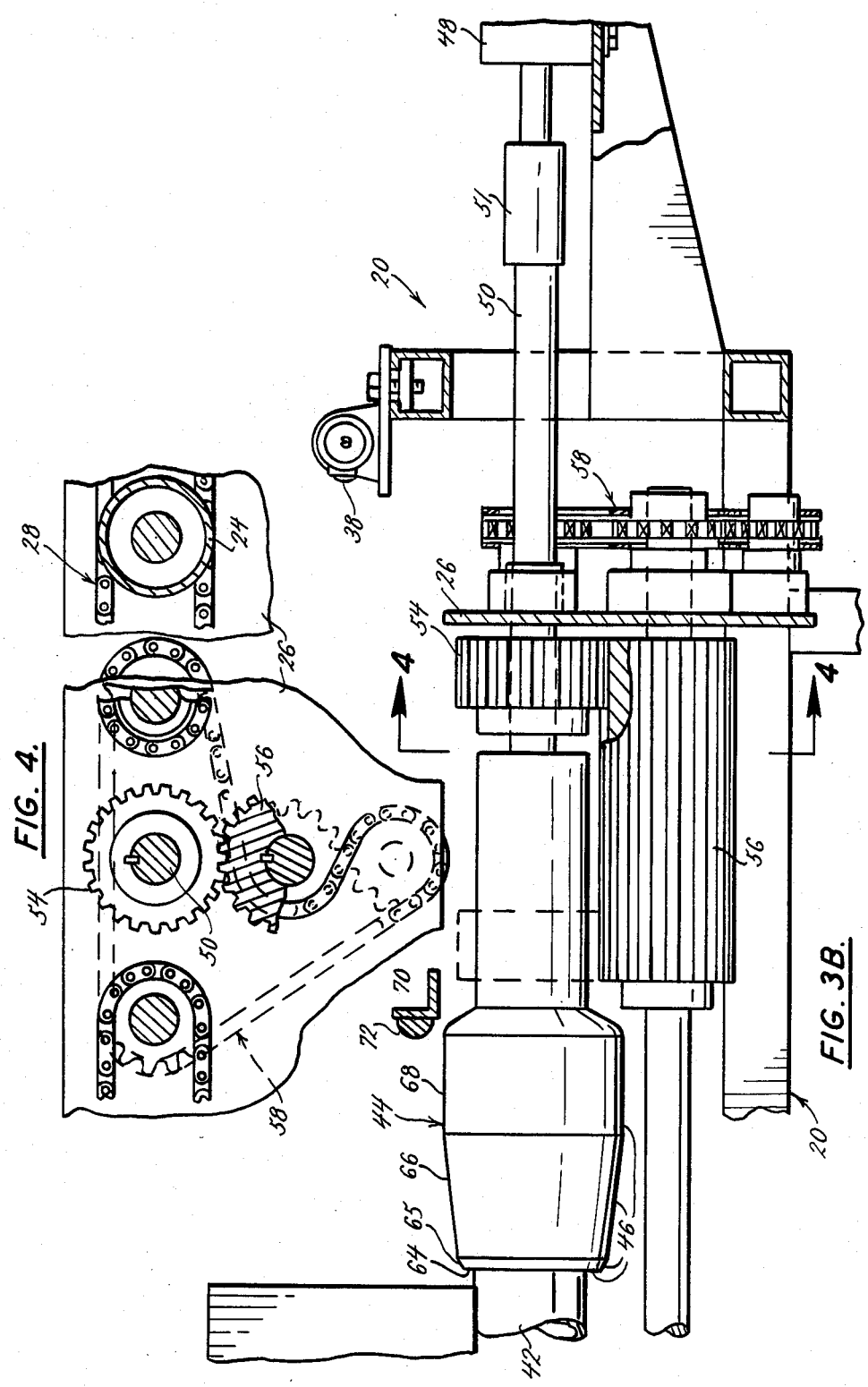

PRODUCT TURNING DEVICE FOR CONVEYOR

BACKGROUND AND SUMMARY

Conveyor systems have long been used in various industries to move all sorts of products. To increase the usefulness and versatility of conveyors, various types of accessory equipment have been developed over the years to change the orientation of the product as it is being conveyed. One example of such an accessory is a product turner which rotates the product in its horizontal plane through any preselected angle. For example, a rectangular shaped product having two short sides and two long sides may be conveyed with either of those sides at the leading and trailing edges. For some product handling operations it is desirable to change the orientation of the product from short side leading to long side leading, or vice versa, by rotating the product in its horizontal plane through a 90° angle while it is being conveyed. An example of a high speed operation which requires product in alternate orientations is palletizing or automatically stacking layers of alternately aligned product on a wooden or plastic pallet.

Various devices have been developed to turn a product on a conveyor including designs incorporating rotatable bumpers which catch a side of the product and rely on the conveyor to rotate the product about the bumper; pivotally mounted grabber bars for grabbing the product along the front and one side and pivoting the product as the conveying surface moves the opposite side of the product around; and other arrangements which work on the idea of stopping one side of the product while the conveying surface pivots the opposite side of the product.

These prior art devices suffer from a relatively slow throughput because of the relatively long time period required to complete a turn as well as the relatively large gap required between successive pieces of product to accommodate the pivoting motion of each product. These prior art devices provide only a limited throughput for several reasons. Firstly, these devices pivot the product about a front corner or edge which takes a greater arcuate movement and hence more time to complete a turn than if the product were rotated about its physical center. Secondly, a larger spacing is required between successive pieces of product to provide room for the greater arcuate movement of each product. Thirdly, virtually all the prior art turners require resetting between successive pieces of product, which increases the minimum spacing permitted between product as the "work area" or "turning area" of the turner must be cleared between turns. Fourthly, virtually all of the prior art turners re-position the product at the rear of or behind the "envelope" in which the product was traveling before entering the turner. In other words, the turner slows down the product during the turn and fails to turn it on its physical center at the conveyor surface speed. This further increases the gap required between product and reduces the throughput. As a result of these and other factors, the surface speed of the conveyor and of individual pieces of product thereon might be quite substantial, while the throughput and delivery of the system is significantly reduced because of the wasted space between successive pieces of product.

Some prior art systems have sought to improve the throughput of turners by utilizing sections of speed up conveyor before the turner which increases the spacing between product, but also increases its speed. Thus, the product is subjected to significantly rougher handling at a higher speed, while the rest of the system is limited to a lower speed and throughput. Furthermore, the mechanical limits of the turner are reached much more rapidly and the rest of the system is locked into a lower speed and throughput.

Because of the low throughput of the prior art product turners, many other automatic machines which depend upon a conveyor input of product through a product turner must also operate at speeds much slower than their rated capacity, thereby limiting their usefulness and throughput. One example of such an arrangement is the automatic palletizing machines which stack product on pallets by layers, with each layer having a different product orientation to achieve a balanced and stable pallet. In these applications, generally a single conveyor brings product to the input side of the palletizing machine in one orientation with every other row or layer of product being turned by a product turner to achieve the proper orientation. Although some of the machines presently available have performance design characteristics which approach the fastest delivery capabilities of present day high speed conveyor designs, prior art product turners can generally operate at only 50% of these top conveyor throughputs and thereby severely limit the speed at which the automatic palletizer may form properly stacked pallets. Thus, the ineffectiveness of a relatively minor component such as a product turner may affect the advisability of investing in much larger and faster equipment which would otherwise significantly improve the throughput and profitability of an automatic operation.

To solve these and other problems in the prior art product turners, applicant has succeeded in designing and developing a new product turner which turns product near its physical center, resets during the turning motion, and accelerates the product through the turn which permits it to operate at a much higher rate approaching and even matching in some instances the product throughout capabilities of present day high velocity conveyors.

Furthermore, applicant's turner actually turns the product within the forward portion of its original envelope, so that it actually increases the gap available in the "working area" when product is being turned from short side leading to long side leading. These advantages combined with the short stroke of the turner drastically reduce the required gap between product which significantly increases its throughput for any conveyor or speed over prior art turners.

Applicant's design can be readily incorporated into a conveyor module for convenient insertion into an existing conveyor stream. Alternately, applicant's product turner may be added by the simple removal and replacement of two driven rollers in a power roller conveyor, the addition of several guide bumpers and a guide bracket, and a photoelectric relay.

Applicant's product turner generally includes an over-sized roller at the entry section to accelerate the product into the turner and agitate the product and make it easier for it to be lifted. This input roller may be tapered and mounted with one end slightly above the conveying surface, or have a single beveled knurl at one end to ensure that the product is skewed slightly into its turn. This prevents any product from entering the turner skewed in the wrong direction which might happen should it have an uneven or damaged bottom or be otherwise mis-aligned. The actual turning of the product is accomplished by a powered roller having a knurl with several different beveled surfaces for pushing, lifting and accelerating, and "whipping" the product as a powered cylinder deflects and returns the knurl and roller transversely underneath the product.

The turning action is started by a light source and sensor which senses the leading edge of the product and as it reaches the roller and knurl, the powered cylinder is operated to bring the knurl into contact with the side thereof. A first beveled surface is formed at a relatively steep angle to "catch" the side of the product and push or skew it quickly. As the knurl pushes against the forward portion of one side, a guide bumper remains in contact with the rearward portion of the opposite side to start the product rotating about its center. The knurl continues its deflection until the forward portion of the opposite side contacts a second guide bumper such that the opposite side is riding against two guide bumpers. If the knurl has not already begun to lift the case, it then does so by sliding under the rear corner of the product over a second and third bevel of the knurl. As this is happening, the forward speed of the conveyor brings the front side of the product into contact with a third somewhat larger guide bumper. By this time the flattened portion of the knurl arrives underneath the rear corner of the product to smoothly accelerate that corner, and the knurl is simultaneously retracted to "whip" the rear of the product around the third guide bumper. This returning transverse movement, combined with the accelerating force of the flattened bevel, effectively whips the rear edge of the product around and completes the turn. It should be understood that the product may actually rest on a narrow portion of one or more of the bevels, or even the line of transition between them. The front edge of the product remains substantially in contact with the guide bumper which "walks around" as the product is turned. A guide bracket along the edge of the conveyor helps catch the side of the product as it is whipped around and aligns it as it moves out of the turner.

As can be appreciated, applicant's product turner has significant advantages over the prior art. As can be better visualized from the drawings, the product is turned by being rotated virtually about its physical center, which reduces the turning time and the gap required between successive pieces of product. Additionally, unlike virtually every prior art product turner, a rotating, reciprocating knurl is used to first offset the case from its original path and then whip the rear edge of the product around and thereby push it into a forward portion of its original envelope (or at least its center) which actually increases the gap available in the working area for the next product. The relatively short stroke of the fast acting drive cylinder provides a very quick cycle time and the cylinder is reset as it completes a cycle. Additionally, by "pushing" the product through a good portion of the desired angular movement, the dead time of the prior art in waiting for the momentum of the case itself to produce the angular rotation is eliminated. Most prior art product turners stop a corner or edge of the product and wait for the opposite side to build up momentum, thereby creating a turning moment which achieves the turn. As can be appreciated, this takes time and reduces the throughput. Thus, applicant has developed a product turner having an elegantly simple design and utilizing a fast acting, direct action traveling roller and knurl which drastically reduces the gap required between successive pieces of product, pushes the product through a good portion of the desired angular movement, resets itself as part of its relatively short cycle, and thereby significantly increases the throughput capability of any conveyor system with which it is used.

Other advantages and features of applicant's product turner may be more fully understood by referring to the drawings and description of the preferred embodiment which follows.

BRIEF DESCRIPTION OF THE DRAWINGS

FIG. 2 is a side view of the conveyor module showing the arrangement of the guide bumpers and conveyor rollers;

FIGS. 3A and 3B are cross-sectional views taken along the plane of line 3—3 in FIG. 2 and detailing the construction and mounting of the two ends of the transfer roller, and showing the multi-beveled knurl;

FIG. 4 is a cross-sectional view taken along the plane of line 4—4 in FIG. 3B and detailing the drive gear and sprocket assembly for the transfer roller.

DETAILED DESCRIPTION OF THE PREFERRED EMBODIMENT

Figure 1:
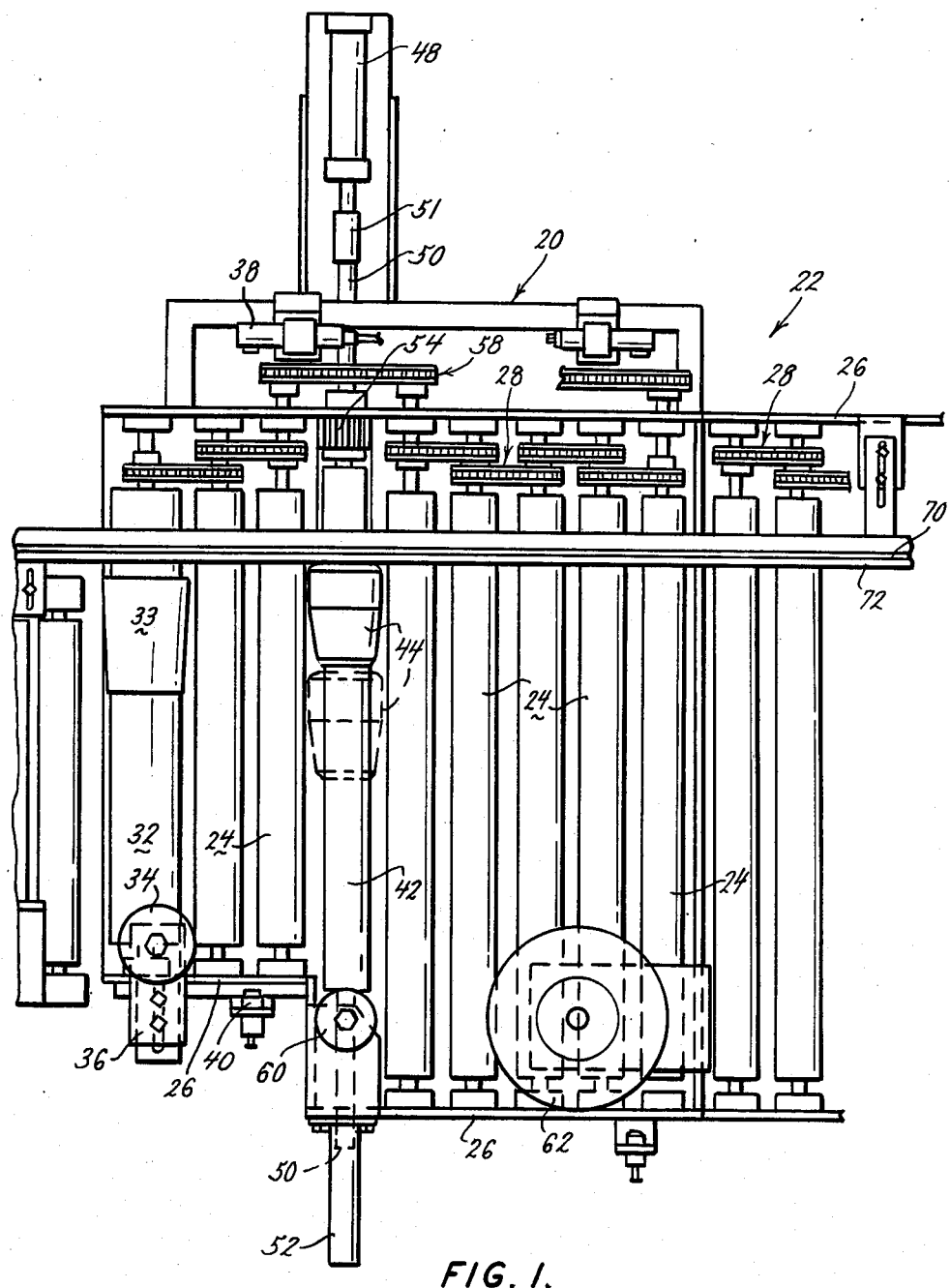
FIG. 1 is an overhead view of applicant's product turner shown mounted as part of the conveyor module.

Applicant's product turner 20 may be provided as part of a module 22 as shown in FIG. 1, or as individual components for modification of an existing conveyor installation. As shown in modular form, a plurality of power driven rollers 24 are mounted between a pair of side frames 26 with chain drives and sprockets 28 along one end of the rollers. An input power roller 32 has a slightly larger diameter and hence a slightly greater speed than the other rollers 24 to provide an acceleration to the product as it enters into the module 22. In addition, a beveled knurl 33 is provided at an end of input roller 32 to slightly accelerate one side of the product and skew it as it enters the module 22. Alternately, it may be desirable in some applications for input roller 32 to be slightly tapered and mounted with its larger end slightly above the conveyor surface to impart a slight skew to product entering the module 22. For example, if the product is expected to have an uneven bottom surface, the knurl 33 or offset mounting of input roller 32 would prevent any inadvertent wrong-way skewing caused by uneven contact with the conveying surface.

A first guide bumper 34 is mounted to side frame 26 adjacent input roller 32 with an adjustable plate and bolt assembly 36. A light source 38 and sensor 40 are mounted opposite one another to side frames 26 and aligned to sense the presence of product through the interruption of its light beam, as is known in the art. A power driven transfer roller 42 extends between side frames 26 and is located just downstream from light source and sensor 38, 40. Transfer roller 42 has a knurl 44 with multiple bevels 46 as shown more particularly in FIG. 3B. An air cylinder 48 is connected to the shaft 50 of transfer roller 42 through slip coupling 51 and aligned to deflect transfer roller 42 in a transverse direction with respect to product flow on the conveying surface of module 22. A bearing and shaft support 52 supports the opposite end of shaft 50 and contains the shaft 50 as it is deflected by air cylinder 48. Transfer roller 42 has a sliding gear 54 mounted on its shaft 50 which is in mesh with and in sliding engagement with drive gear 56 mounted below transfer roller 42. Drive gear 56 is driven by the chain drive coupling 58 at a preselected relative speed to the other power rollers 24 in module 22.

A second guide bumper 60 is adjustably mounted to side frame 26 and substantially aligned with transfer roller 42 to contact the side of the product and prevent its being pushed off the conveyor surface as it is being turned. Pivot bumper 62 is a non-driven rotatable bumper and may be an inflated tire which is somewhat larger than the first two guide bumpers 34, 60. Pivot bumper 62 contacts the front of the product and rotates along with the front surface of the product as it is turned through the action of transfer roller 42, as will be explained in more detail hereinafter.

As explained above, applicant's product turner 20 is shown and described as part of a module 22 for the easy and convenient insertion into a conveyor stream. Alternately, applicant's product turner 20 may be installed directly into an existing power driven roller conveyor by substituting the input roller 32, transfer roller 42, air cylinder 48, the associated drive gearing and supports, photocell and sensor 38 and 40, and guide bumpers 34, 50, and 62. These components may be easily installed and used to modify an existing installation such as at the conveyor input to a palletizer, or output of a de-palletizer to properly orient product for alternate rows or layers.

The transfer roller 42 and knurl 44 are shown in somewhat more detail in FIG. 3B to include four separate bevels 46 to assist in the pushing, lifting and accelerating, and turning of the product as the transfer roller 42 is deflected and returned during a turning operation. These bevels may be cut at various angles to perform their intended function and could vary to suit various types of products. Therefore, the particular angles disclosed herein are merely representative of a wide range of angles and combinations thereof which can be used rather successfully in applicant's product turner. Furthermore, because one side of the product is usually in contact with the conveyor surface, the product may only contact a small portion of any bevel or the line of transition between them. This is especially true of the fourth, generally flattened bevel which is parallel to the conveyor surface. Accordingly, applicant does not limit his invention to the particular angles and bevels disclosed herein as many different angles and combinations of bevels may work just as well and within the scope of applicant's teaching. A first bevel 64 may be formed at approximately 90° with the surface of roller 42. There may be no width to first bevel 64 and first bevel 64 serves to initially contact the side of the product and skew it almost halfway through its turn until it rides against both the guide bumpers 60, 62.

A narrow second bevel 65 tapers upward from the edge of first bevel 64 at an angle of approximately 33° to act as a wedge and quickly lift the edge of the product following the "push" portion of the cycle, above the conveyor surface and onto third bevel 66.

The third bevel 66 may be formed at an angle of 13° with respect to the surface of transfer roller 42 and may be approximately 2¾ inches (6.985 cm) wide. The third bevel 66 elevates the rear of the product and smoothly accelerates it. This acceleration is caused by the sloping surface of third bevel 66 which rides under the back corner of the product, thus presenting a gradually increasing diameter to the product over that of the transfer roller 42 and other conveyor rollers 24. The rear corner of the product thus moves up the third bevel 66 and onto the generally flattened fourth bevel 68 which may have a width of approximately 2⅛ inches (5.40 cm). Because of the "tilt" of the product, it may only rest on a small portion of fourth bevel 68, or the line of transition between it and third bevel 66. It should be understood that this is included in applicant's meaning when he describes the product as resting on the fourth bevel 68. At the far reach of transfer roller 42 the rear of the product is driven in a pivoting action as the front edge of the product is walked around by guide bumper 62. To enhance this pivoting motion and hasten completion of the turn, the entire transfer roller 42 is returned to its home position as the product is being driven by fourth bevel 68. Thus, the combination of the increased speed applied to the rear of the product along with the return transverse movement of transfer roller 42 and knurl 44 significantly decreases the turning time for a product. Guide bracket 70 is mounted along the conveyor module 22 and has a rounded inner surface 72 to "catch" the side of the product opposite guide bumper 62 and ensure proper product alignment as it leaves module 22.

OPERATION

Applicant's product turner is elegantly simple when compared with the complicated and inefficient turners in the prior art, and represents a breakthrough in high speed turning required to permit more complicated machinery to operate at or near their rated throughputs. Applicant's turner operates on the lower surface and side of the product and has no cylinders or pushers acting on the sidewalls which might result in damaged or broken containers. The product may be fed into the turner by any type of conveyor and in either the short edge leading or long edge leading orientation.

Figure 5A:
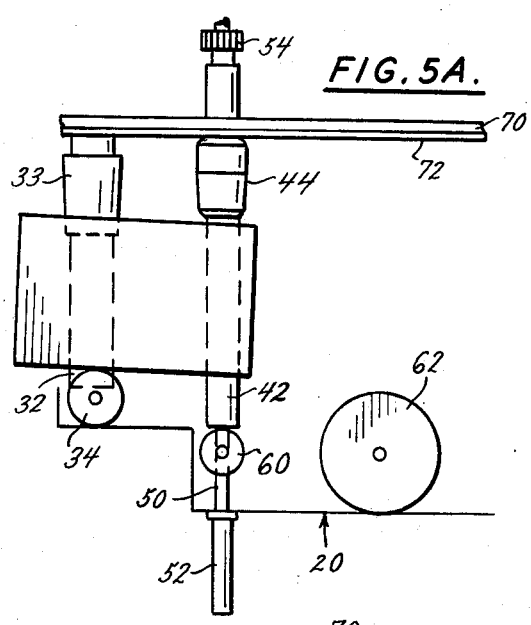
FIGS. 5A–5F are a series of schematic views showing the progression of a product through the product turner.
Figure 5B:
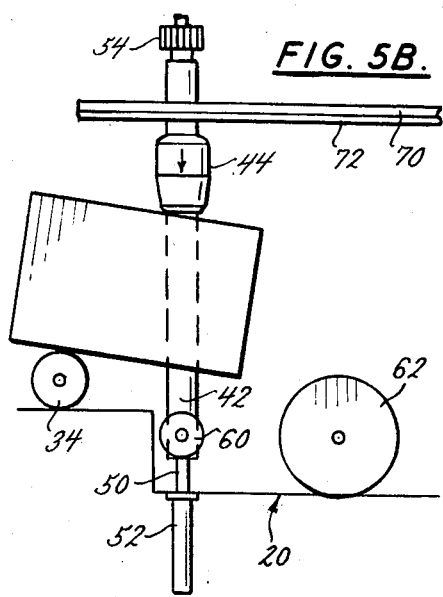

As the product rolls in over the input roller, it is accelerated and slightly skewed into the turn as it moves adjacent the light source and sensor. This acceleration and skewing also helps to agitate or jiggle the product making it easier for the knurl to get a "bite" on it and push it across the conveying surface. Light source and sensor sense the leading edge of the product and begin the transfer motion of the transfer roller and knurl. The first bevel of the knurl contacts the side of the product and skews it across the driven roller surface. The product continues to be driven by the rollers so that the first bevel slides along the side of the product as its opposite side contacts and then rolls along the guide bumper mounted opposite the knurl. This is best shown in FIG. 5B.

Figure 5C:
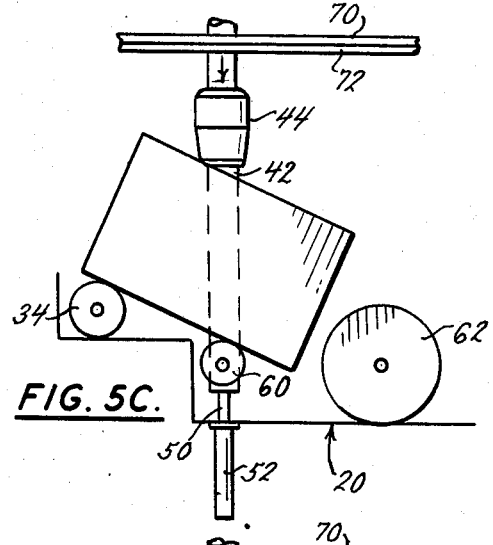
Figure 5D:
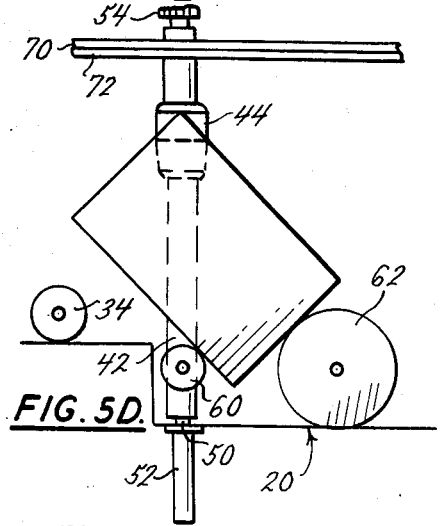

This product movement continues until the knurl has pushed the product against a second guide bumper, as is shown in FIG. 5C. At this position, the product resists further lateral movement and thus is lifted up onto the second bevel, and then onto the more gradually sloping third bevel. The third bevel provides a smooth acceleration and continues the turning motion of the product until the generally flattened fourth bevel supports the rear corner of the product and the front edge contacts the third guide bumper. This occurs at the point of full extension of the transfer roller as depicted in FIG. 5D.

Figure 5E:
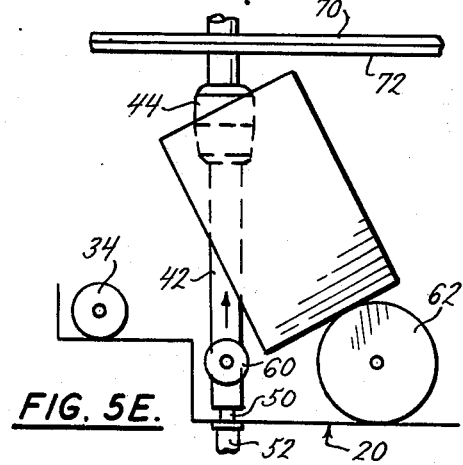
Figure 5F:
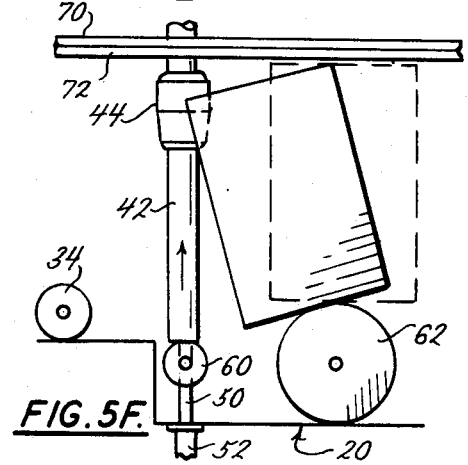

In this position, the rear of the product is being driven at a speed greater than the rest of the product and the transfer roller is returned to its home position with the product resting on the knurl. The resultant vector of force applied by the fourth bevel is thus applied to the rear of the product and in a pivoting direction which literally "whips" it around and through the turn. This is best shown in FIG. 5E. The product is maintained in substantial alignment through the turn by the guide bumper at the front of the product and a guide bracket opposite the guide bumper catches the opposite side of the product to correct any inadvertent skewing before it leaves the turner module. This is best shown in FIG. 5F. The progression of the product as it moves through the turn is shown in FIGS. 5A-5F as indicated above.

Light source and sensor sense the product as it enters the beam, and a time delay relay, or more sophisticated controller such as a Texas Instruments 5TI can be used to control the transfer roller as it reciprocates through a turning cycle. To maintain the transfer roller in a driving relationship as it is deflected, a sliding gear drive is provided which includes a drive gear mounted at the end of transfer roller in mesh and sliding engagement with another drive gear disposed beneath the transfer roller. The second drive gear is substantially wider than the first drive gear so that the transfer roller and its drive gear may slide along its width and yet remain in a driving relationship therewith.

Various changes and modifications would be apparent to one of ordinary skill in the art as suggested in and taught by applicant's disclosure. These changes and modifications are included as part of applicant's invention and he intends that his invention be limited only by the scope of the claims appended hereto.

I claim:

1. A product turner for changing the orientation of a product with respect to a conveyor, said product turner comprising a power driven roller, said roller having an elongated rotary product supporting surface and a bevelled knurl on said roller, and means to transfer said roller and said knurl transversely to said conveyor and said product and underneath the product so that said knurl will contact the product to turn it.

2. The turner of claim 1 wherein said knurl has a first bevel to initially contact and push said product and at least one second bevel to accelerate and lift said product.

3. The turner of claim 2 wherein said knurl has a third, generally flattened, bevel to support said product and apply a driving speed to said product appreciably greater than the speed of the conveyor.

4. The turner of claim 1 further comprising a first guide bumper mounted to said conveyor to contact a side of the product and hold it on the conveyor surface as the knurl contacts said product.

5. The turner of claim 4 further comprising a second guide bumper mounted to the same side of said conveyor as said first guide bumper and downstream therefrom to contact the front of the product and pivot with it as it moves through its turn.

6. The turner of claim 1 further comprising means to accelerate and agitate the product as it enters the product turner.

7. The turner of claim 6 wherein said accelerating and agitating means includes means to change the orientation of the product with respect to the conveyor.

8. The turner of claim 7 wherein said accelerating, agitating, and orientation means comprises a driven roller with a tapered knurl having a surface speed greater than the surface speed of the conveyor.

9. The turner of claim 1 further comprising a driven roller with a tapered knurl upstream of the power driven roller, said tapered knurl having a surface speed greater than the conveyor surface speed.

10. The turner of claim 1 wherein the roller transfer means comprises a drive cylinder secured to an end of the power driven roller.

11. The turner of claim 1 further comprising means to continuously drive the power driven roller as it is transferred.

12. The device of claim 11 wherein the continuous drive means includes a first gear mounted to the power driven roller and a second gear in mesh with said first gear, at least one of said gears being sufficiently wide to permit relative transverse movement therebetween while maintaining said gears in mesh.

13. The device of claim 1 further comprising means to sense the presence of product and initiate the transverse movement of the knurl and roller.

14. The device of claim 1 further comprising means to return the knurl and power driven roller when the product is supported by the knurl to thereby help turn the product.

15. The turner of claim 14 further comprising a guide bracket mounted along the conveyor to contact the side of the product as the knurl returns.

16. A continuous feed, high speed product turner for a power driven roller conveyor comprising a power driven roller with an elongated rotary product supporting surface and a knurl thereon, means to transfer said roller and knurl transversely to the direction of product flow on said conveyor to bring said knurl into contact with the product, said knurl having a first bevel to push the product, at least one second bevel to engage an edge of the product and accelerate it, and still another generally flattened bevel to engage the lower surface of the product, means to return said roller with said knurl to its start position as the product rests on said other bevel to thereby assist in turning the product, and a plurality of guide bumpers to engage the sides of the product and hold it on the conveyor as it is being turned.

17. The turner of claim 16 further comprising a driven input roller having a conveying speed greater than the conveyor surface speed to agitate the product.

18. The turner of claim 16 further comprising a driven input roller, said input roller having a tapered knurl to impart a slight skew to said product as it enters said product turner.

19. The turner of claim 16 wherein said first bevel is formed at approximately 90°, one of said second bevels is formed at approximately 13°, and said other bevel is formed at approximately 0°, said angles being measured with respect to the surface of said power driven roller, or a line parallel thereto.

20. The turner of claim 16 wherein said first bevel is formed at approximately 30°, said second bevel is formed at approximately 13°, and said other bevel is formed at approximately 0°, said angles being measured with respect to the surface of said power driven roller, or a line parallel thereto.

21. The turner of claim 18 wherein said plurality of guide bumpers includes a first guide bumper mounted adjacent said driven tapered input roller, a second guide bumper mounted adjacent said power driven roller with knurl, and a third guide bumper mounted downstream from said second guide bumper.

22. The turner of claim 18 further comprising a guide bracket mounted along the conveyor to contact the side of the product as the knurl returns.

* * * * *